(12) United States Patent
Davis et al.

(10) Patent No.: US 10,845,343 B2
(45) Date of Patent: *Nov. 24, 2020

(54) PROCESS FOR FINDING POTENTIAL DEFECT INDICATIONS IN REAL TIME WHILE ULTRASONICALLY SCANNING A WELD

(71) Applicant: VeriPhase, Inc., Birmingham, AL (US)

(72) Inventors: John Mark Davis, Hoover, AL (US); Archibald Leach Cobbs, Mountain Brook, AL (US); Charles Allan Hansen, Sterrett, AL (US); Nicholas James Bublitz, Chelsea, AL (US); Samuel Matthew Davis, Birmingham, AL (US)

(73) Assignee: VeriPhase, Inc., Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,697

(22) Filed: Dec. 6, 2019

(65) Prior Publication Data
US 2020/0110062 A1    Apr. 9, 2020

Related U.S. Application Data

(63) Continuation-in-part of application No. 15/866,571, filed on Jan. 10, 2018, now Pat. No. 10,551,351, and
(Continued)

(51) Int. Cl.
*G01N 29/44* (2006.01)
*G01N 29/24* (2006.01)
(Continued)

(52) U.S. Cl.
CPC ....... *G01N 29/4427* (2013.01); *G01N 29/048* (2013.01); *G01N 29/24* (2013.01);
(Continued)

(58) Field of Classification Search
CPC .. G01N 29/043; G01N 29/048; G01N 29/069; G01N 29/24; G01N 29/262;
(Continued)

(56) References Cited

U.S. PATENT DOCUMENTS 6,813,949 B2 * 11/2004 Masaniello ............... F17D 5/02
73/602
10,324,066 B1 * 6/2019 Davis ..................... G01N 29/11
(Continued)

*Primary Examiner* — Natalie Huls
(74) *Attorney, Agent, or Firm* — The Gache Law Firm, P.C.; Russell C. Gache

(57) ABSTRACT

A process is disclosed in which a computing device reads electronic data from an ultrasonic scanning probe and processes that data in real time to determine if any potential weld defects are encountered as the probe head moves along scanning the weld. The method receives weld scan data in the form of scanning slices and determines if any of the encountered indications match a predetermined criterion. The process utilizes a moving scan data window of scan slices and processes each window for indications of weld defects. The processing of the data window is optimized using a rule-based, indications counting set so that any found defect indications triggers the issuance of a signal to an operator, in various forms, such as activating a marking module, issuing an alert signal, or printing a report.

20 Claims, 3 Drawing Sheets

Related U.S. Application Data a continuation-in-part of application No. 14/986,195, filed on Dec. 31, 2015, now Pat. No. 10,324,066.

(51) Int. Cl.
*G01N 29/265* (2006.01)
*G01N 29/04* (2006.01)
*G01N 29/26* (2006.01)
*G08B 7/06* (2006.01)

(52) U.S. Cl.
CPC ......... *G01N 29/262* (2013.01); *G01N 29/265* (2013.01); *G01N 2291/0234* (2013.01); *G01N 2291/0289* (2013.01); *G01N 2291/044* (2013.01); *G01N 2291/101* (2013.01); *G01N 2291/2675* (2013.01); *G08B 7/06* (2013.01)

(58) Field of Classification Search
CPC .. G01N 29/265; G01N 29/44; G01N 29/4427; G01N 29/4445; G01N 2291/0234; G01N 2291/0289; G01N 2291/044
See application file for complete search history.

(56) References Cited

U.S. PATENT DOCUMENTS

| | | | | |
|---|---|---|---|---|
| 10,551,351 | B1* | 2/2020 | Davis | G01N 29/11 |
| 10,557,833 | B2* | 2/2020 | Davis | G01N 29/44 |
| 2007/0038400 | A1* | 2/2007 | Lee | B23K 11/24 |
| | | | | 702/103 |
| 2008/0072674 | A1* | 3/2008 | Ume | G01N 29/2418 |
| | | | | 73/627 |
| 2009/0164143 | A1* | 6/2009 | Duckworth | G01M 5/0033 |
| | | | | 702/38 |
| 2010/0064495 | A1* | 3/2010 | Iizuka | G01N 29/265 |
| | | | | 29/407.01 |
| 2011/0083512 | A1* | 4/2011 | Imbert | G01N 29/0645 |
| | | | | 73/622 |
| 2014/0238136 | A1* | 8/2014 | Ten Grotenhuis | |
| | | | | G01N 29/0654 |
| | | | | 73/592 |
| 2016/0231291 | A1* | 8/2016 | Boulware | G01N 29/0645 |
| 2017/0122909 | A1* | 5/2017 | Goroshevskiy | G01M 5/0025 |
| 2017/0182605 | A1* | 6/2017 | Rajagopalan | B23K 9/0282 |
| 2018/0031152 | A1* | 2/2018 | Rajagopalan | B23K 31/125 |
| 2018/0136169 | A1* | 5/2018 | Ume | B23K 31/125 |

* cited by examiner

PROCESS FOR FINDING POTENTIAL DEFECT INDICATIONS IN REAL TIME WHILE ULTRASONICALLY SCANNING A WELD

This application claims the benefit of filing priority under 35 U.S.C. § 120 of the co-pending application Ser. No. 15/866,571 filed on Jan. 10, 2018, for a System and Method for Efficiently Reviewing Weld Scan Data by a Weld Inspector, which is a division of U.S. non-provisional application Ser. No. 14/986,195 filed Dec. 31, 2015, for a System and Method for the Improved Analysis of Ultrasonic Weld Data, now issued as U.S. Pat. No. 10,324,066B1. All information disclosed in those prior nonprovisional applications is hereby incorporated by reference.

FIELD OF THE INVENTION

The present invention relates to ultrasonic scanning of welds to enable an inspector to determine if weld remediation is needed. In particular, the present invention relates to data analysis of ultrasonic phased array testing data to issue a signal upon the discovery of a potential flaw indications. In even greater particularity, the present invention relates to the issuance in real time of signals, such as a marking signal, resulting from the ultrasonic scanning of a weld in a construction site for defects.

BACKGROUND OF THE INVENTION

Bridges, buildings, railroads, pipes, vessels, tanks, and other metal or steel welded structures are a vital part of modern infrastructure. These structures are typically fabricated from sets of discrete metal sub-components that are welded together to form a critical component and/or a total system. Welded seams and other weld joining points must be fused into a welded unit having satisfactory strength to ensure code compliance and to achieve proper structural integrity of the entire system, and/or to ensure meeting the purpose of the design for which it was intended. For example, a pressure vessel or fluid tank must have watertight exterior as well as provide structural support for the entire vessel or tank system. Pipes and vessels similarly must have water or gas sealed, welded seams to ensure the integrity of the pipe/vessel and to properly isolate the fluid or gas held by the pipe from the environment. In addition, these systems deteriorate over time due to operational and environmental factors such as, internal product transfer, stagnant fluid or product, residual and applied stresses, vibration, rain, snow, strong winds, temperature variance, earthquakes, oxidation, material fatigue, and other changes that occur over the passage of time. Hence, nondestructive testing of welds and metal structures, and their components, are utilized after initial fabrication, installation, and periodically thereafter, to ensure a structure's integrity. Further, both for new construction and routine periodic maintenance, careful analysis of the weld joints in each structure is necessary to ensure satisfaction of various weld specifications, industry codes, and construction regulations. For example, the American Society of Mechanical Engineers ("ASME"), the American Welding Society ("AWS"), and the American Petroleum Institute ("API"), among others, each have their own welding codes, procedures, and specifications.

Modern inspectors use non-destructive test ("NDT") equipment to inspect constructed metal (e.g. steel) structures and their weld joints. These inspection devices use ultrasonic wave generators to take digital "snap-shots" of welds from which an inspector may verify weld integrity and to ensure compliance with welding codes and specifications. Ultrasonic technology is used to detect internal and surface breaking flaws in the weld and the base metal, which are not visible externally, and is based on the principle that a gap or defect in the weld changes the propagation of ultrasonic sound through the metal. One common method of NDT testing uses conventional, single-probe ultrasonic testing requiring an operator's interpretation of a screen similar to an oscilloscope screen that presents time and amplitude information. Another method uses an array of ultrasonic phased array probe sensors to test a structure. Such methods can be combined into a single digital piece of inspection equipment that uses phased array ("PA") and time-of-flight ("TOFD") diffraction methodologies to provide a three-dimensional image of a weld displayed on a color screen. An inspector then evaluates the potential for a flaw or defect in the weld by reviewing the screen. Such ultrasonic testing ("UT") equipment is typically highly mobile, and allows for the recordation of ultrasonic data for the analysis of welded areas in joined metal pieces, and includes the use of both manual and motorized encoding devices. For example, Olympus NDT, Inc. markets and sells ultrasonic units through its OmniScan™ and Epoch™ lines of weld flaw detectors. The Olympus ultrasonic inspection systems include conventional ultrasonic flaw detectors, which use ultrasonic waveforms to detect flaws, and advanced ultrasonic phased array flaw detectors, which create internal cross-section images of the areas being inspected. These ultrasonic flaw detectors may also be configured to do a phased array ultrasonic testing ("PAUT") inspection that produces encoded digital data points on welds which may be further processed at a later time, including the tracking of specific locations of such data points on a weld using an encoder. The data may also be reviewed later at a time convenient for an inspector and in an environment away from the component or structure's location, which is typically more suitable for detailed analysis work. Such ultrasonic data is recorded and saved in large data files which may be retrieved for evaluation by an inspector using specialized software applications. While these data files are readable by the ultrasonic testing device, software applications also exist that assist in the evaluation and visual display of such inspection data on common computing devices, such as a personal computer (PC). An example of such applications is the OmniPC™ software also available from Olympus NDT, Inc., along with an additional toolset called TomoView™. Both of these tools allow for a more precise and reliable review of the three-dimensional ultrasonic data by an inspector decoupled in time and location from an actual testing device with its ultrasonic probe.

A phased array data file consists of captured data representative of continuous A-scans along a weld which may be processed to create a three-dimensional data set representative of the top, side, and end views of a weld joint. Within each A-scan, a series of recorded data points record an intensity or amplitude value from 0% to 100% or greater full screen height of "FSH" ultrasonic signal reflections. These data points are then saved as OPD, RTD or other industry applicable data file formats for subsequent analysis. Since the recordation of ultrasonic data is correlated to the exact PA probe position on the weld being tested, the inspector may use the analysis software including various sets of sophisticated analysis tools to review the recorded data in a number of geometric views and orientations (e.g. top view, side view, end view) to improve inspection review accuracy.

Further information regarding the use of phased array UT equipment, configuring such UT equipment, establishing a scan plan applicable to a particular inspection or weld joint design situation, the recording of that data in various file formats, the physics and geometries of the ultrasonic sound beams and resulting scanning views in UT, the use and applicability of "data" libraries, the storing of testing data files, the usage of different types of scan views, the visual analysis of weld flaw indications, and the generation of inspection reports based upon UT shall not be discussed herein as such information is well known known in the NDT industry and not necessary for a complete understanding of the disclosed invention. However, Applicant references and hereby incorporates by reference the treatise *UT Classroom Training Book*, Paul T. Marks, ISDN No. 978-1-57117-345-4 (e-book), published by The American Society for Nondestructive Testing, and two treatises published by Olympus NDT, Inc: (1) *Introduction to Phased Array Ultrasonic Technology Applications*, third printing 2007, ISBN No. 0-9735933-4-2; and (2) *Advances in Phased Array Ultrasonic Technology Applications*, 2007, ISBN No. 0-9735933-4-2. The books may be obtained at the ASNT website www.asnt.org or the Olympus NDT resources website www.olympus-ims.com. These treatises explain the above subjects in detail and the general theory of UT using modern equipment. Further, Applicant references and hereby incorporates by reference U.S. Pat. Nos. 8,156, 813B2, 8,577,629B2, 9,032,802B2, and 9,081,490B2. These patents discuss and disclose background information regarding the electronics and theory behind PA ultrasonic testing.

PA ultrasonic and time-of-flight diffraction inspection for those weld seams can produce extremely large data files requiring many hours of data review and analysis of all data points along the weld seams by an inspector. Usually most of the data points are nominal, satisfactory welds, creating a monotonous review period and potentially reducing weld flaw recognition by an inspector due to fatigue and other human factors. Recently, the Applicant obtained a patent on a method to reduce the time for the data analysis and reporting process of weld analysis, which can be a tedious and fatiguing task for inspectors. See U.S. Pat. No. 10,324, 066B1 ('066 patent). That invention allows for the enhancement of the inspection process by focusing an inspector's attention on actual weld defect indications by excluding data points that present satisfactory and acceptable weld characteristics. Nevertheless, while useful, the '066 system and methods are not configured for real-time analysis by a weld inspector in the field at the actual weld site.

In addition, while marking technologies for marking of industrial materials already exist and are widely used in the marking of materials during manufacturing. These detection and marking technologies are not often configured for portable, field use on welds at a construction site. For example, REA Elektronik GmbH, located in Muehltal, Germany, manufactures various configurations of spray heads under the trade name RE JET that may mark materials as they pass by the head during manufacturing. E.g. REA JET ST SR-5. Further, Rockwell Automation offers a series of micro and nano controls systems such as the Micro8xx controller series and the MicroLogix 1xxx series that will accept an external signal and issue controller signals with the proper timing and actuation forms to a spray head that will mark materials that are passed by the spray head.

However, marking of actual weld flaws on a part, as part of a real-time testing methodology is problematic. First, real time identification of weld indications, to the extent it exists at all, is typically relegated to simple gate amplitude triggering, which might be caused by a variety of reasons. Hence, any ultrasonic signals that might issue from existing testing system, whether for marking purposes or just the issuing of testing device alerts, does not draw an inspector's attention to meritorious weld flaw indications, but identifies many types of indications that in most instances do not affect weld integrity. Second, to the extent that testing equipment can identify indications at all in real time, a great deal of time must be spent to separate false indications from true indications, thereby reducing the reliability of any real-time testing. Moreover, any efficiencies that might result from automated NDT using PA testing equipment is lost because the testing is inefficient and unreliable. So, while some marking technologies exist for identifying indications, they are not yet used for the real-time identification of meritorious weld flaw indications in the field or at manufacturing sites.

Because no reliable real-time testing strategy exists identifying meritorious weld flaws, weld inspectors end up simply inspecting the majority of the entire weld using a either a handheld or encoded scanner held by an ultrasonic probe connected to an OmniScan™ or other ultrasonic detector to manually locate and mark for weld indications. In the case of manual probe scanning, the inspector manipulates a UT probe head connected to the instrument over a targeted weld area and while visually monitoring a display screen on the instrument, marks with a grease pencil or other suitable marker, any relevant indications found as the inspector scans the weld with the probe. With an encoded scanner, the inspector typically scans the entire weld, or specific required areas of the weld, and reviews the encoded data after the scan for indications on the instrument or using other post analysis software programs. With encoded scanning, the instrument records a scan data file as the scanner moves the probe(s) over the weld area. This enables the inspector to visually "rewind" the data file to any potential indication areas they wish to visually review by adjusting the encoded scan travel index using a scrolling wheel or other means on the instrument which permits a controlled moving view of potential indications on the screen. By manually adjusting the probe scan travel index values on the instrument, the examiner may accurately mark on the weld the length of the indication. Using this coordinated movement, the examiner finds the highest peak of the indication and moves the probe travel index left and right to find the starting and ending positions of any meritorious weld indications that need characterization, repair, or follow-up inspections.

While the system and method described in the '066 Patent makes the inspection process more efficient, that inspection process almost always occurs detached in time and location from the actual construction site. Further, the external visual appearance of any weld does not usually guide an inspector to a potential weld flaw, thereby requiring the augmentation of sophisticated equipment to locate and mark a weld for further work as described above. Hence, an inspector who is tasked to inspect in-person a weld at a construction site must utilize an ultrasonic instrument and encoding device to locate the weld indication under scrutiny using the encoded travel indexing recorded in the scan data file and displayed by the instrument brought by the inspector to the construction site. This increases the time and difficulty of both inspection and remediation of a weld at a construction site. The inspection process of a weld would be hastened and facilitated for an inspector if each indication was already marked prior to arrival so that an inspector could be visually guided at the actual site of welding to each indication without the usage of the original scanning equipment, or if an indication signal could trigger another type of alert to an inspector as automated equipment is moved over a weld. Hence, what is needed is a system for finding potential weld defect indications in real time while scanning a welded joint and which can communicate to an operator the existence of such defect indications, such as by issuing a report recording these found defects, issuing an alert for each indication, or passing a marking signal to an associated marking device for each indication.

SUMMARY OF THE INVENTION

In summary, the invention reads data from a PAUT instrument while a scanning probe head collects data and processes that data in real time to determine if any weld indications of potential weld defects are present in the captured ultrasonic testing data. The invention receives weld scan data into a computing device or ultrasonic instrument as data is being collected, processes that data in real time to find weld defect indications, determines if any of those indications meet a pre-determined criterion, and then issues a signal or mark to an operator in various forms. The process utilizes a moving scanning data window of scan slices and processes each window of scan data for indications in real time. The processing of the data window is further optimized using a rule-based, indications counting set so that signals are generated in time for, for example, a marking module associated with the UT instrument to be able to mark the found weld indications as the scanning probe moves along the weld site or weld seam, issue acoustic or visible alerts to the operator, or produce a report immediately upon the completion of the scanning of the weld.

Other features and objects and advantages of the present invention will become apparent from a reading of the following description as well as a study of the appended drawings.

BRIEF DESCRIPTION OF THE DRAWINGS

A process incorporating the features of the invention is depicted in the attached drawings which form a portion of the disclosure and wherein.

DESCRIPTION OF THE PREFERRED EMBODIMENTS

Figure 1:
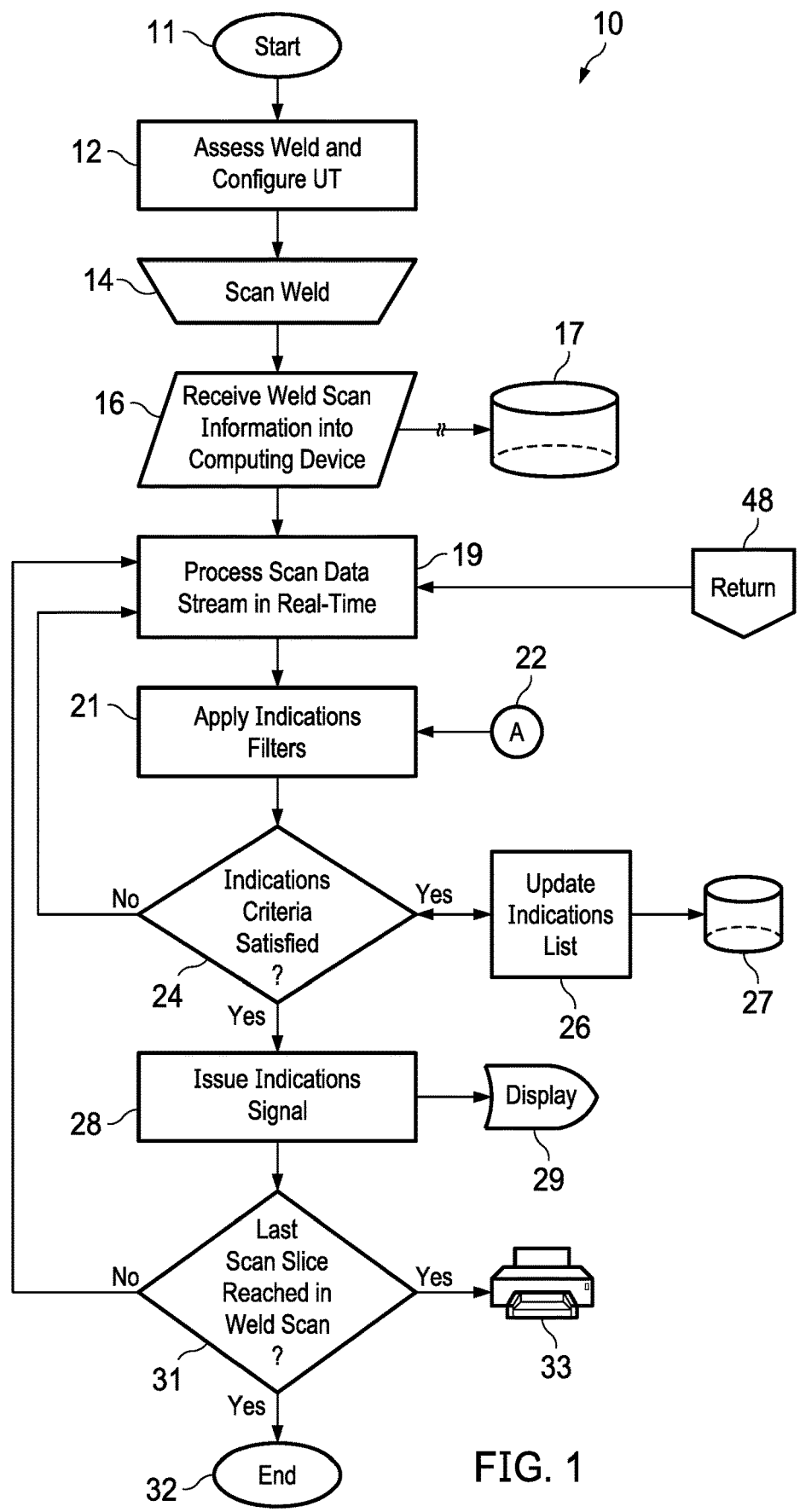
FIG. 1 is a process diagram showing the top-level steps of the invention.

Referring to the drawings for a better understanding of the function and structure of the invention, FIG. 1 shows a process diagram showing the top-level steps 10 of the disclosed method. Initially, a weld on a part or structure is accessed, and a UT probe and connected scanner are configured 12. The process of configuring a scan is known, but for the purpose of a full and clear disclosure applicant hereby incorporates by reference FIGS. 1-3, and pages 7-10 of application Ser. No. 15/866,571 ("'571 Application") filed on Jan. 10, 2018, and also incorporates by reference FIGS. 1-3, and pages 7-10 of U.S. non-provisional application Ser. No. 14/986,195 filed Dec. 31, 2015, now issued as U.S. Pat. No. 10,324,066B1 ("'066 Patent") to explain the process.

As shown in those referenced drawings, the PA (phased array) UT probe takes sectional scan "snap-shots" along the weld seam or travel path and saves that information in a raw scan data file that records the scan information pursuant to a 3-dimensional coordinate system disclosed and described in the '571 Application and the '066 Patent. Applicant hereby incorporates by reference FIGS. 4, 4A, and 4B and pages 11-13 (top) of application Ser. No. 15/866,571 ("'571 Application") filed on Jan. 10, 2018, and also incorporates by reference FIGS. 4, 4A, and 4B and pages 11-13 (top) of U.S. non-provisional application Ser. No. 14/986,195 filed Dec. 31, 2015, now issued as U.S. Pat. No. 10,324,066B1 that explains this data structure. That structured scan data is received by a computing device 16 and, optionally, saved in its raw data form in computer storage 17. As may be understood, computer storage 17 may be a local subsystem or a remote system in highspeed communication with a computer system associated with the scanning system collecting the data, such as a geographically remote storage system like cloud-based computer storage. The scanner connected computer system may be a personal computer (PC) or other suitably fast computing hardware as is commonly available.

A data stream collected by the PA UT probe is processed in real time 19 to find potential base metal or weld defect imperfections using a sliding data collection window as will be further described. Once a set of indications 22 is collected, one or more filters is applied to those indications 21 to screen out indications that are known to be non-defect data. If criteria for sending a indication signal is satisfied 24, a signal is sent 28 to, for example, a marking module (not shown) or a computer display on the computing device is activated 29 to indicate the existence of a weld indication. A running list of indications is kept 26 and stored in computer storage 27. The process 10 ends 32 upon the last scan slice being processed in the scanned weld 31 and that scan slice being incorporated into the entire scanning analysis. A final consolidated indications list may also be printed upon completion of the scanning of the weld 33.

Figure 2:
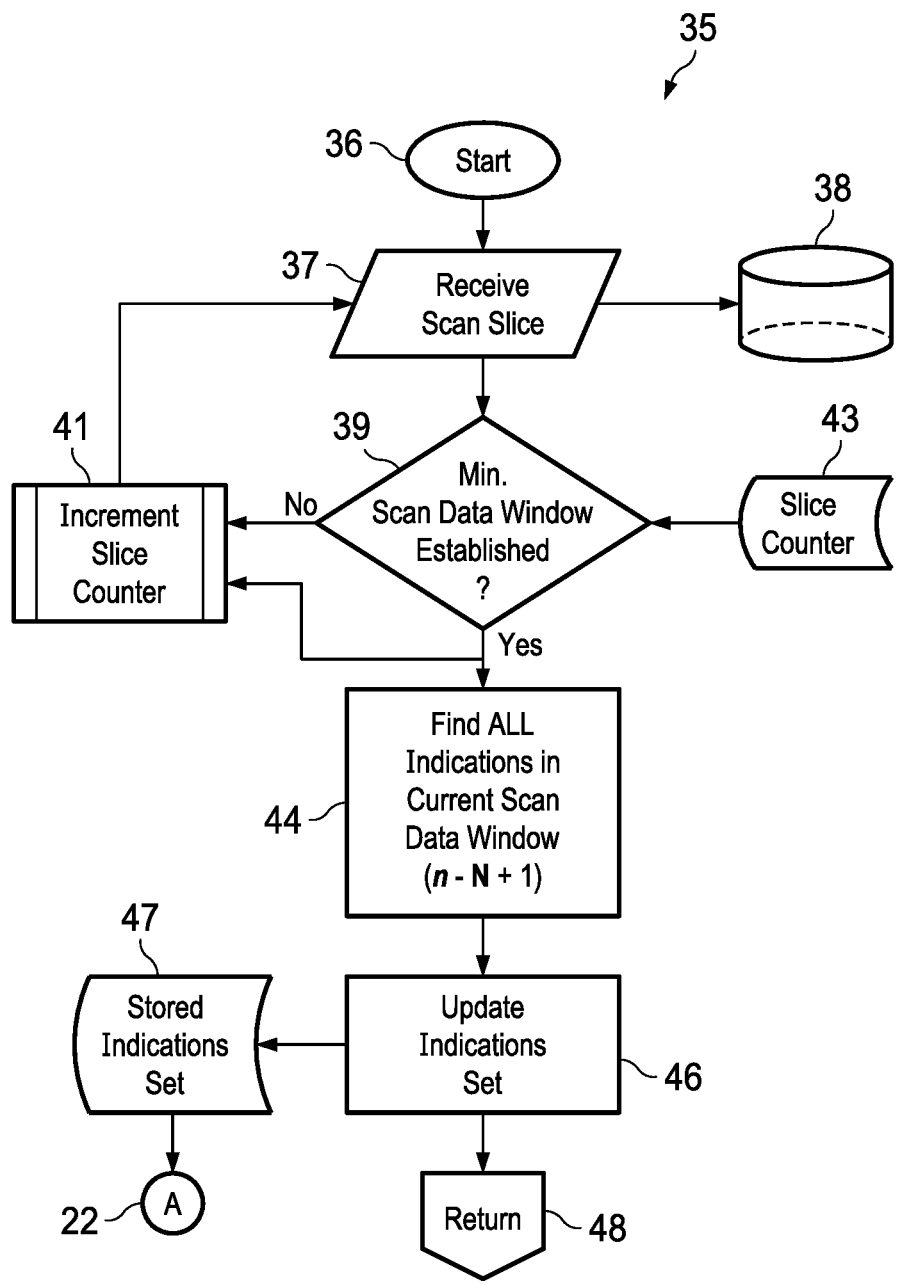
FIG. 2 is a process diagram showing a subprocess to find indications in real time from received real-time scanning data; and, FIG. 3 is a decision criteria diagram based on enumerated rules governing voxel counts to optimize the processing of scan data.

Referring now to FIG. 2, step 19 of FIG. 1 is further defined pursuant to sub-process 35. After resetting of all counters and set values to zero at the start 36, each scan slice is received electronically by the computing device from the mechanically actuated scanning probe 37 and saved in computer storage 38. As each scan slice is received a determination is made as to whether a sufficiently large scanning window of data has been established 39 to allow for reliable processing of scan data to proceed to determine whether a true indication exists. Process 35 depends upon the establishing of a "sliding window" of scan data to produce reliable processing results. For the purposes of clarity in this disclosure, applicant designates this sliding window of slice data as a "scanning data window" that takes individual or successive snap-shots of scan data as the weld is scanned by the probe head. A scan window length of scan slices N is pre-established and upon reaching the minimum first window amount of scan slices N the data contained in the window is processed for weld indications. If the minimum of N scan slices has not yet been met, a data slice counter is incremented 41 and the next scan slice is received 37. This data reception loop continues until a first scanning data window containing N scanning slices is received upon which a search for all weld indications in the scanning data window is initiated 44. The slice counter is continually incremented 41 to keep track of which scan slices are being included within the processed scanning data window, even after a first scan data window of data has been received.

As each slice is received 37, a series of slices S is stored 38 with each being assigned a slice number n starting with 1. After receiving a series of scan slices, a sufficiently large first scanning window of data suitable for processing will be established upon a slice having a slice number value of n=N, or a slice being received having a value of $S_N$. A second scanning data window will have a scanning window number of 2 and correspond to a received slice number of N+1. Hence, the last slice received for each scanning data window number to be processed will be $S_{(n-N+1)}$ with each new scanning data window having a number of (n-N+1). Starting with the first scanning data window, each successive scanning data window will be processed 44 upon the receipt of each new scanned slice of data. As may be understood, sub-process 35 processes a series of scan data windows with each window of data comprised of a fixed number of data slices, but with each window dropping the oldest slice of scan data in inclusive favor of the newest slice of data in the window.

The processing 44 of each scanning data window is accomplished using the processing steps described in the above referenced '571 Application and the '066 Patent. In particular, the process utilized for extracting weld indications from a data file is disclosed in Applicant's prior applications at FIGS. 5-7, and pages 13-21 (top) of application Ser. No. 15/866,571 ("'571 Application") filed on Jan. 10, 2018, and FIGS. 5-7, and pages 13-21 (top) of Application Serial of U.S. non-provisional application Ser. No. 14/986,195 filed Dec. 31, 2015, now issued as U.S. Pat. No. 10,324,066B1. These referenced sections are hereby incorporated by reference by Applicant to support the processing step 44 and results in the collection of weld indications, potentially for review by a weld inspector.

As may be understood, the slice window value N may be correlated to a minimum weld length or distance over which an ultrasonic probe is advanced since each scan slice has a known finite width as described above in the cited references. The pre-determination of the size of N is constrained by a number of data processing trade-offs. For example, the longer the scan length minimum the more accurate a determination of potential weld flaws may be made because data trends in the collected scan information may be utilized to filter out false indications resulting from, for example, reflections due to weld geometries. However, a longer minimum requires a longer length or delay between the UT probe head and an associated signal or marking module, thereby complicating the arrangement of a usable real-time weld flaw identification system. Conversely, a shorter scan length or delay will facilitate the issuance of a signal or marking action by a scan-head system, but increases the potential number of false weld indications that must be dealt with. Empirically, the inventors have determined that a value for N is based on the value of the selected scan resolution of saved slices in the data file. A typical scan resolution is 1 mm which equates to 25.4 captures or slices of data within 1 inch of scan movement. The inventors anticipate that an operator of a real-time weld scanning system utilizing the herewith disclosed process may start with a value of 250 for N, and adjust that value in response to the number of false indications calculated by the system for a particular weld environment.

Once a scanning data window has been processed the number of weld indications is accumulated into a set of indications and updated 46 with each processing of data for each scanning data window. The stored indications set 47 is filtered 21 (see FIG. 1) and a pre-determined criteria applied 24 as previously discussed. Control of the sub-process 35 is then returned 48 to process 10 at step 19 (see FIG. 1) for further processing.

Figure 3:
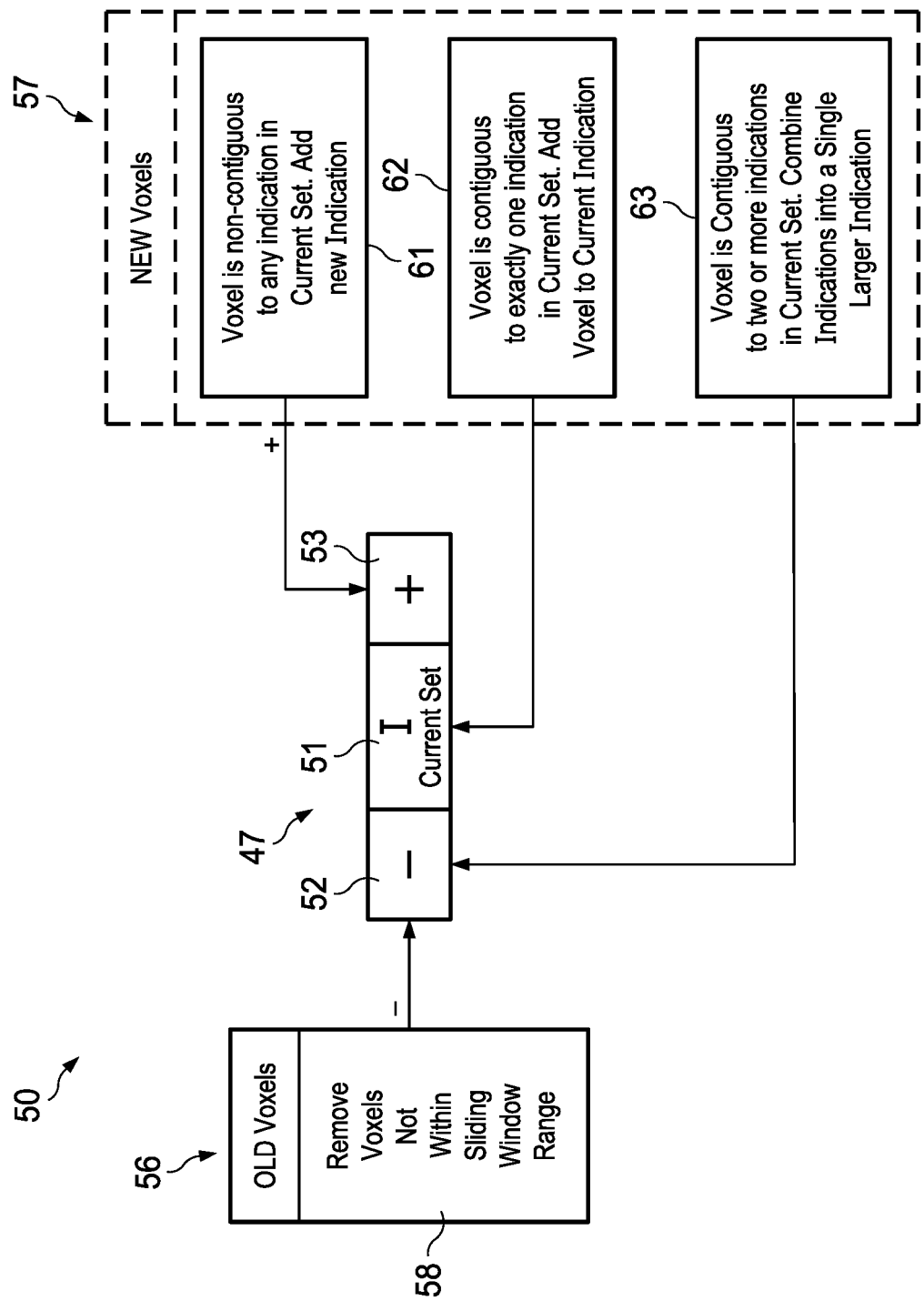

The step of updating an indications set 46 is implemented via an up-down like counter, or a shift-in/shift-out like sub-process utilizing a set of processing rules 50 as shown in FIG. 3. Starting from an initial zero value, a first set of weld indications is established pursuant to processing step 44 for the first scanning data window and recorded as a current indication set 51 in indications counter 47. Each successive processing of a scanning data window causes counter 47 to be adjusted either up 53 or down 52 responsive to the application of rules (56,57) to new voxels arriving in the processed scanning data window 57, or the removal of old voxels 56 previously presented in the prior processed scanning data windows as the window moves along. The following rules govern the increase or decrease of the value in the indications set 51 shown in FIG. 3.

Rule 61: If a new voxel is non-contiguous to any indication already present in the current indication set 51, a new indication 53 is added to the current set 51 for any voxel above a minimum magnitude threshold of a typical value of 16% FSH (Full Screen Height).

Rule 62: If a new voxel is contiguous to exactly one indication in the current indication set, add the voxel to the current indication already in the set, thereby having a net zero effect to the current indications set number 51.

Rule 63: If a new voxel is contiguous to two or more indications in the current set, combine the indications into a single larger indication, thereby having a net negative effect 52 to the current set 51 by the net resulting loss of indications through the combination.

Rule 56: If any counted old voxel is no longer within the sliding scanning data window (i.e. any voxel from scan slices having a value of (n-N) or lower), remove the voxel and adjust the current set 51 via up-down counter scheme 47 accordingly.

In addition to the above described simple updating technique pursuant to the stated rules, further processing reductions may be realized by eliminating nominal indication processing steps that require the processing of each and every indication received in a slice. First, every new scan data slice may be evaluated to classify each new indication in the slice data in one of two groups—all indications that existed prior to the currently received scan; and all indications that are new. Since each voxel, and thereby each indication, has unique geometric assignment information associated with it, each indication can be compared to each prior indication within prior received scanning windows to determine prior reception. Therefore, only indications that are newly created or modified in each new slice need to be evaluated. All others are discarded and not processed. For example, any pre-filtering constraints that would normally be applied to all indications no longer would need to be applied to any pre-existing indications. This provides a substantial reduction in processing resources.

Secondly, for any remaining new or modified indications, only indications that exhibit a magnitude that is greater than a geometric reflection minimum need be processed. In other words, any newly received data which is monotonic with respect to reflections caused by the geometry of the weld, and not a result of a potential weld flaw indication, can be excluded from further processing. By processing geometry-based indications across all scans, a consistent noise/geometry pattern at a given index & depth location may be established. This established geometric reflection information may then be used to determine whether an indication is part of a larger consistent noise/geometry signal at that index & depth location. If it is consistent, the indication may be excluded from processing. This can be applied to successive scan slices to allow the exclusions of those indications that are just noise or geometric reflection signals. Further, this exclusion technique allows for an increased, but accurate exclusion rate over time as the sampling set become larger and noise/geometry recognition improves.

The above described processing methods of keeping a running tally of indications in a single set, adjusting that set value for only indications that merit processing, is faster and more reliable than continually determining a new set of indications for each and every new indication present in each new scanning data window. Since it is faster, it also permits the enlargement of the data held in the scanning data window thereby making the processing more reliable since data trends are more readily relied upon.

Referring again to FIG. 1, and as indicated above, only indications that are above a typical value of 16% FSH meet a minimum magnitude threshold that to trigger the issuance of an indications signal shown in step 24 and 28. However, once an indication triggers the transmission of a signal, that indication is flagged as an issued indication and recorded. Any additional processing by process 10 that would generate an additional signal for an indication that has already been recorded will be excluded from further issuance of a new signals per step 24 based on input from step 26 of flagged indications that are stored 27 in the computer system. As may be understood, in the event that a report is to be issued upon the last processing of the last scan slice, the report will include a listing of the indications recorded via step 26 as saved in computer storage 27.

While I have shown my invention in one form, it will be obvious to those skilled in the art that it is not so limited but is susceptible of various changes and modifications without departing from the spirit thereof.

The invention claimed is:

1. A process for producing a signal indicating a potential weld flaw indication, comprising the steps of:
   a. ultrasonically scanning a weld for indications of potential flaws in said weld using a scanning probe head;
   b. receiving weld scan data from said scanning probe head in a computer device;
   c. in said computer device, processing in real time said received scan data to remove non-meritorious defect indications;
   d. after said processing step, determining if any remaining defect indications satisfy a predetermined criterion;
   e. keeping a running tally of defect indications satisfying said predetermined criterion; and,
   f. responsive to said criterion determination step, issuing a signal indicative of the existence of any said remaining meritorious indications.

2. The process as recited in claim 1, wherein said step of processing said received scan data in real time comprises the steps of:
   a. establishing a first scanning data window of scanning slices of said weld;
   b. processing said first scanning data window for weld defect indications;
   c. establishing an indications set representing the number of indications found in said scanning data window;
   d. processing successive scanning data windows received from said scanning probe upon receipt by said computer device and updating said indications set; and,
   e. repeating said successive processing step until all scanning slices from said scanning probe head have been processed for indications.

3. The process as recited in claim 2, wherein said step of keeping a tally comprises utilizing an up/down counter to keep track of said indications set, wherein said up/down counter counts responsively to a set of voxel reception rules operable on the number of voxels present in each said received scanning slice.

4. The process as recited in claim 3, wherein said step of processing said received scan data in real time further comprises the step of establishing a minimum number of scanning slices for any scanning data window and receiving said minimum number of scanning slices prior to processing said first received scanning data window for indications.

5. The process as recited in claim 4, wherein said step of determining if any remaining defect indications satisfy a predetermined criterion comprises meeting a minimum voxel indications magnitude value.

6. The process as recited in claim 3, wherein said voxel reception rules includes the rule of if a newly received voxel is non-contiguous to any prior determined weld indication in the current set of weld indications then add a new indication to the current set of indications.

7. The process as recited in claim 6, wherein said voxel reception rules includes the rule of removing old voxels not within the sliding window range of any newly received scanning data window.

8. The process as recited in claim 2, wherein any step of processing a scanning data window in real time comprises the step of issuing a signal occurring with sufficient time for an output device connected to said scanning probe head to alert an operator as said scanning probe head is moved along said weld to scan for defects.

9. The process as recited in claim 2, wherein any step of processing a scanning data window comprises the steps of:
   a. extracting all voxels held by said scan data window having a non-zero magnitude value and saving those voxels in an indications data file along with three-dimensional position information within said weld for each said voxel; and,
   b. assigning a unique group identifier for all voxels in said indications data file that are positioned immediately adjacent to one another in said weld such that each group identifier represents a separate weld indication.

10. A process for producing a signal while scanning a weld for defects, comprising the steps of:
    a. ultrasonically scanning a weld for indications of potential flaws in said weld using a scanning probe;
    b. receiving weld scan data from said scanning probe in a computer device;
    c. said computer device processing in real time said received weld scan data to find all meritorious defect indications in said scan data using a plurality of data window portions of said scan data to process said scan data;
    d. determining if any of said found indications meet a minimum criterion; and,
    e. sending a signal corresponding to all said found indications meeting said criteria for reception by a system connected to said computer device.

11. The process as recited in claim 10, wherein said step of processing said received weld scan data further comprises utilizing an up/down counter to keep track of said indications set, wherein said up/down counter counts responsively to a set of voxel reception rules operable on the number of voxels present in each received scanning slice of weld scan data.

12. The process as recited in claim 11, wherein said step of processing said received weld scan data in real time further comprises the step of establishing a minimum number of scanning slices for each said plurality of data window portions and receiving said minimum number of scanning slices prior to processing said first received data window portion for indications.

13. The process as recited in claim 12, wherein said step of sending a signal comprises the step of sending a signal to an electrically connected system selected from a group consisting of a marking module having coordinated movement with said scanning probe, a display screen, an acoustic device, and a printer.

14. The process as recited in claim 11, wherein said voxel reception rules includes the rule of if a newly received voxel is non-contiguous to any prior determined weld indication in the current set of weld indications then add a new indication to the current set of indications.

15. The process as recited in claim 11, wherein said voxel reception rules includes the rule of removing old voxels not within the sliding window data range of any newly received scanning slices of data.

16. A process for producing a signal while ultrasonically scanning a weld for defects, comprising the steps of:
  a. receiving weld scanning data from a scanning probe in a computing device, said weld scanning data including a plurality of scanning slices representative of said weld;
  b. processing said received weld scanning data in real time to find all meritorious defect indications in each said scanning slice using a scanning data window;
  c. determining if any defect indications found in said scanning data window satisfy a minimum criterion; and,
  d. if said minimum criterion is satisfied, sending a signal for reception by a system having coordinated operation with said scanning probe.

17. The process as recited in claim 16, wherein said step of processing said received weld scanning data in real time using a scanning data window comprises the steps of:
  a. extracting all voxels held by said scanning slice having a non-zero magnitude value and saving those voxels in an indications data file along with three-dimensional position information within said weld for each said voxel; and,
  b. assigning a unique group identifier for all voxels in said indications data file that are positioned immediately adjacent to one another in said weld for each meritorious indication such that each group identifier represents a separate weld indication.

18. The process as recited in claim 17, wherein said step of processing said weld scanning data in real time comprises the step of issuing a marking signal with sufficient time for a marking device connected to said scanning probe to mark said weld as said scanning probe is moved along said weld to scan for defects.

19. The process as recited in claim 16, wherein said step of processing said received weld scanning data in real time further comprises the step of establishing a minimum number of scan slices for any scanning data window and receiving said minimum number of scan slices prior to processing said first received scanning data window for indications.

20. The process as recited in claim 16, wherein said system having coordinated operation comprises a printer, and further including the step of after receiving all weld scanning data from said scanning probe representative of said weld, printing a report from said printer after the processing all scan data slices listing all meritorious indications.

* * * * *